US009527762B2

(12) United States Patent
Roeck et al.

(10) Patent No.: US 9,527,762 B2
(45) Date of Patent: Dec. 27, 2016

(54) APPARATUS FOR PRESSING AND PLACING GLASS PREFORMS

(71) Applicant: Zwiesel Kristallglas AG, Zwiesel (DE)

(72) Inventors: Gerhard Roeck, Zwiesel (DE); Klaus Lesche, Kirchberg (DE)

(73) Assignee: Zwiesel Kristallglas AG, Zwiesel (DE)

(*) Notice: Subject to any disclaimer, the term of this patent is extended or adjusted under 35 U.S.C. 154(b) by 0 days.

(21) Appl. No.: 14/681,606

(22) Filed: Apr. 8, 2015

(65) Prior Publication Data

US 2015/0291466 A1  Oct. 15, 2015

(30) Foreign Application Priority Data

Apr. 9, 2014 (DE) .................. 10 2014 005 279

(51) Int. Cl.
| | |
|---|---|
| C03B 9/193 | (2006.01) |
| C03B 9/195 | (2006.01) |
| C03B 11/02 | (2006.01) |
| C03B 11/10 | (2006.01) |

(52) U.S. Cl.
CPC ............. *C03B 9/1932* (2013.01); *C03B 9/195* (2013.01); *C03B 11/02* (2013.01); *C03B 11/10* (2013.01); *Y02P 40/57* (2015.11)

(58) Field of Classification Search
CPC ................ C03B 9/1932–9/1938; C03B 11/02; C03B 11/10
See application file for complete search history.

(56) References Cited

U.S. PATENT DOCUMENTS

| | | | |
|---|---|---|---|
| 1,532,163 A | | 4/1925 | Stewart |
| 1,888,318 A | * | 11/1932 | Hofmann ............. C03B 9/1955 65/221 |
| 2,124,091 A | | 7/1938 | Wadsworth |
| 2,669,806 A | * | 2/1954 | Van De Walle .......... C03B 7/14 65/164 |
| 3,834,884 A | | 9/1974 | Kurokawa et al. |
| 4,200,449 A | * | 4/1980 | Martin ..................... C03B 7/16 65/229 |

(Continued)

OTHER PUBLICATIONS

Extended European Search Report for related Application No. 15000646.8 dated Sep. 1, 2015, 6 pages.

*Primary Examiner* — Jason L Lazorcik
(74) *Attorney, Agent, or Firm* — Armstrong Teasdale LLP (57) ABSTRACT

An apparatus for pressing glass preforms and placing the glass preforms into a blowing machine is provided. The apparatus includes a first plunger configured to be reciprocated between a gob-receiving region and a first preform-pressing region, a second plunger configured to be reciprocated between the gob-receiving region and a second preform-pressing region, a first press mold associated with the first plunger and configured to be reciprocated between the first preform-pressing region and a preform-placing region, and a second press mold associated with the second plunger and configured to be reciprocated between the second preform-pressing region and the preform-placing region. The respective plungers are configured interact with the respective associated press molds in the respective preform-pressing regions such that a gob received in the gob-receiving region by one of the respective plungers is formed into a glass preform and received by the respective associated press mold.

20 Claims, 7 Drawing Sheets

(56) References Cited

U.S. PATENT DOCUMENTS

| | | | | |
|---|---|---|---|---|
| 4,289,523 A | * | 9/1981 | Murakawa | C03B 9/195 65/172 |
| 4,432,783 A | | 2/1984 | Dahms | |
| 2007/0157669 A1 | * | 7/2007 | Hayamizu | C03B 7/12 65/66 |
| 2015/0232364 A1 | * | 8/2015 | Fujimoto | C03B 11/02 65/102 |
| 2015/0291466 A1 | * | 10/2015 | Roeck | C03B 9/195 65/72 |

* cited by examiner

APPARATUS FOR PRESSING AND PLACING GLASS PREFORMS

CROSS REFERENCE TO RELATED APPLICATIONS

This application claims the benefit of DE Patent Application No. 10 2014 005 279.6 filed Apr. 9, 2014, which is hereby incorporated by reference in its entirety.

BACKGROUND OF THE DISCLOSURE

The present invention relates to an apparatus and a method for pressing glass preforms, or parisons, and for placing the glass preforms into a blowing machine, as well as to a blowing machine including such an apparatus.

In the production of glass vessels, such as drinking glasses, use is often made of rotary blowing machines in which a plurality of blow molds with associated work tables and blow heads are rotated around the blowing machine body in a carousel-like fashion. To blow the glass vessels, a preform, or parison, of liquid glass is placed onto a rotating work table, whereupon the associated blow head is lowered and arranged at the preform in an airtight way in order to blow up the preform in the associated blow mold.

To provide the glass preform, first of all a liquid glass drop, also referred to as a gob, is taken from molten glass and pressed in a press mold to form the glass preform. Subsequently, the glass preform is placed into the blowing machine, particularly onto one of the work tables thereof, by means of a placing mechanism. This process needs to be automated and take place at high cycle rates to ensure a highest possible productivity.

BRIEF DESCRIPTION OF THE DISCLOSURE

The systems and methods described herein achieve high throughput in the pressing of glass preforms, or parisons, and placing of the glass preforms into a blowing machine.

According to one aspect, an apparatus for pressing glass preforms, or parisons, and placing the glass preforms into a blowing machine is provided. The apparatus includes a first plunger that can be reciprocated between a gob-receiving region and a first preform, or parison, pressing region; a second plunger that can be reciprocated between the gob-receiving region and a second preform, or parison, pressing region; a first press mold that is associated with the first plunger and can be reciprocated between the first preform-pressing region and a preform, or parison, placing region; and a second press mold that is associated with the second plunger and can be reciprocated between the second preform-pressing region and the preform-placing region, wherein the respective plungers can interact with the respective associated press molds in the respective preform-pressing regions such that a gob received in the gob-receiving region by one of the respective plungers is formed into a glass preform, or parison, and received by the associated press mold. The apparatus is configured such that after interaction of the respective plunger with the associated press mold, the respective plunger is moved back to the gob-receiving region while the respective press mold is moved to the preform-placing region to place the glass preform into the blowing machine there.

The glass preforms are preforms, or parisons, of liquid glass and have a substantially predefined shape, which allows further machining, in particular blowing, of the glass preform in the blowing machine. The glass preforms are also referred to as "pastilles". The glass preforms may already be goblet-shaped. However, a configuration as a glass tablet may be used, as less reshaping of the gob to form the tablet shape is required, which results in less heat loss of the liquid glass and thus in improved surface quality of the blown product. On a side facing away from the blow head in the blowing machine, the glass tablet may have an elevation or tip that can be used as a base for a stem at the finished blown glass product.

A gob refers to a liquid glass drop. It can be taken from molten glass, for example by draining a certain quantity of liquid glass from a drop outlet of a melting tank and separating it at the drop outlet by means of shears.

The gob-receiving region is a region in which the plungers can receive the gob. For example, this may be the region directly below the drop outlet of the melting tank. Alternatively, the gob-receiving region may be the region at the end of a gob chute, which extends from the region below the drop outlet. In the receiving process of the gob, the gob falls into a dedicated molding portion of the (first or second) plunger, wherein the molding portion may be formed as a recess. After the gob has been received in the gob-receiving region, the gob is located in the plunger, particularly in the molding portion thereof, with the shear marks at the gob caused by the shears being directed laterally outward, as will be explained at a later stage with respect to the blowing machine.

The first plunger and the second plunger can each be reciprocated between the gob-receiving region and the respect preform-pressing regions. This reciprocation may be performed in a horizontal plane. Specifically, each of the plungers can be arranged or supported so as to be pivotable about a vertical axis, so that they can be reciprocated between the gob-receiving region and the respective preform-pressing regions. As only one plunger at a time can be arranged in the gob-receiving region for receiving the gob, the plungers are may be alternately arranged in the gob-receiving region to alternately receive a gob. The movement of a plunger from the gob-receiving region to the respective preform-pressing region as well as the movement of the same plunger from the preform-pressing region back to the gob-receiving region can in particular be along the same movement path. Independent of the movement between the gob-receiving region and the respective preform-pressing regions, the first and second plungers can each be movable in a vertical direction.

The preform-placing region represents the region in which the press molds can place the glass preform into the blowing machine. The apparatus can be matched with the blowing machine such that when the glass preform is placed in the preform-placing region by the (first or second) press mold, a ready-to-receive work table of the blowing machine is also arranged in the preform-placing region below the press mold. The glass preforms can be received by the press molds by means of application of negative pressure to the press mold. When the glass preforms are placed into the blowing machine, in particular onto a work table thereof, the negative pressure can be released and/or the glass preform can be detached from the press mold by means of compressed air. To this end, the press molds can each have one or a plurality of suction opening(s) and/or compressed air opening(s).

The first press mold and the second press mold can be reciprocated between the respective preform-pressing regions and the preform-placing region. This reciprocation may be performed in a horizontal plane. Specifically, the press forms can each be arranged or supported so as to be pivotable about a vertical axis, so that they can be reciprocated between the respective preform-pressing regions and the preform-placing region. As only one press mold at a time can be arranged in the preform-placing region for placing the preform, the press molds may be alternately arranged in the preform-placing region to alternately place a preform. The movement of a press mold from the respective preform-pressing region to the preform-placing region as well as the movement of the same press mold from the preform-placing region back to the respective preform-pressing region can in particular be along the same movement path.

The preform-pressing regions are located between the gob-receiving region and the preform-placing region. In the respective preform-pressing regions, the respective plungers interact with the respective associated press molds such that a gob received by the plunger is reshaped to form a glass preform. The interaction particularly comprises a movement of the (first or second) plunger and/or of the associated press mold toward each other, so that the gob is clamped between the plunger and the press molds and pressed to form a glass preform. The plunger and the press mold may be arranged one above the other in the preform-pressing region and moved toward each other in the vertical direction. Here, the plunger may be arranged below the press mold, and the plunger is moved toward the press mold in the vertical direction relative to the press mold. However, it is also conceivable, alternatively or in addition, to move the press mold toward the plunger in the vertical direction relative to the plunger. Directional and positional indications, such as horizontal, vertical, up, down, in the present description and claims are to be understood with respect to a set up, operational apparatus. Here, the preform-pressing region does not have to be a fixed point in the horizontal movement plane of the respective plungers and press molds. Instead, during the interaction, particularly during the formation of the glass preform, the plungers and press molds can be moved further in the horizontal direction as long as no relative movement between the plunger and the associated press mold in the horizontal direction occurs. Advantageously, the gobs while being reshaped to form the glass preform can be transported further toward the preform-placing region.

After interaction of the respective plunger with the associated press mold, the respective plunger is moved back to the gob-receiving region while the respective press mold with the glass preform is moved further to the preform-placing region to place the glass preform into the blowing machine. The plunger moved back to the gob-receiving region can receive a gob there again, while the other plunger is moved away from the gob-receiving region and in the preform-pressing region, together with the associated press mold, forms a glass preform. In this way, the apparatus allows a workflow in which the respective plungers and press molds alternately receive gobs, press glass preforms, and place the glass preforms into the blowing machine.

In the following, the reciprocation of the plungers between the gob-receiving region and the respective preform-pressing regions, as well as the reciprocation of the press molds between the respective preform-pressing regions and the preform-placing regions is sometimes referred to as a "transport movement", and the direction of the transport movement is sometimes referred to as a "transport direction". The transport direction may be a horizontal direction. On the other hand, the movement of the plunger and/or of the press mold with respect to each other for pressing the preform upon interaction is sometimes referred to as a "pressing movement, and the direction of the pressing movement is sometimes referred to as a "pressing direction". The pressing direction may be a vertical direction.

The apparatus has the following advantages: By providing two plungers, which can each be reciprocated between the gob-receiving region and a preform-pressing region, one can make optimum use of the possible gob output rate at the drop outlet (which usually is higher than the cycle rate of an individual plunger-press mold pair for pressing, transporting, and placing the glass preform), because while a plunger-press mold pair presses, transports, and places a glass preform, the plunger of the other plunger-press mold pair can be moved back to the gob-receiving region and receive a gob there again. It is further advantageous that a plunger only needs to be reciprocated between the gob-receiving region and the preform-pressing region, so that the plunger can already be moved back to the gob-receiving region, while the associated press mold transports the glass preform further to the preform-placing region. In particular, the plunger can already receive a new gob, while the press mold associated with the plunger places the thus-formed preform into the blowing machine. It is a further advantage that the plungers are not moved up to the preform-placing region, i.e. up to the blowing machine. Usually, the plungers have a high construction height, as they comprise the actuators for the movement with respect to the associated press mold for pressing the preforms. When the plungers are moved up to the preform-placing region, the blowing machine must be designed such that no part of the blowing machine, in particular no rotating part of the blowing machine, contacts the plunger in the preform-placing region. Due to the plungers moving only up to the preform-pressing region and not up to the preform-placing region, it is particularly possible to use a rotary machine that has support bottoms arranged below the work tables, which can be moved in the vertical direction for supporting the blown up glass product.

The first plunger, the second plunger, the first press mold, and the second press mold may each be pivotably arranged about a common vertical axis.

The pivotable arrangement allows movements of the respective plungers between the gob-receiving region and the respective preform-pressing regions in a horizontal plane. The pivotable arrangement further allows movements of the respective press molds between the respective preform-pressing regions and the preform-placing region in a horizontal plane. The plungers and the press molds can each be arranged pivotably via pivot arms, wherein the pivot arm are rotatably supported about the common vertical axis. The pivot arms may all have substantially the same length, and the plungers and press molds can move along a same circular path in a plan view.

Advantageously, the pivotable arrangement of the plungers and press molds about a common plane allows a compact construction of the apparatus as well as a simple alignment of the plungers and of the associated press molds with respect to each other upon interaction for reshaping the gob.

The movement of the first plunger from the gob-receiving region to the first preform-pressing region and the movement of the second plunger from the gob-receiving region to the second preform-pressing region may be in opposite directions of rotation.

Likewise, the movement of the first press mold from the first preform-pressing region to the preform-placing region and the movement of the second press mold from the second preform-pressing region to the preform-placing region may be in the opposite directions of rotation.

Advantageously, a movement in the opposite directions of rotation allows the transport paths of the first plunger-press mold pair and the second plunger-press mold pair not to cross. Moreover, it is possible to make the best possible use of the space between the gob-receiving region and the preform-placing region.

The first plunger, the second plunger, the first press mold, and the second press mold may be moved independently.

It is also conceivable to fixedly arrange the first plunger relative to the second plunger in the transport direction, so that the first plunger and the second plunger can only be moved together in the transport direction. It is also conceivable to fixedly arrange the first press mold relative to the second press mold in the transport direction, so that the first press mold and the second press molds can only be moved together in the transport direction. However, it may be more advantageous with respect to process speed that the first plunger, the second plunger, the first press mold, and the second press mold be each movable relative to each other.

Advantageously, due to the mutually independent mobility of the plungers and press molds, process speed and throughput can be increased as the motion sequences of the respective plungers and press molds can be optimized independently.

The first plunger, the second plunger, the first press mold, and the second press mold may be at least partly supported on a base of the apparatus via telescoped hollow shafts.

Here, at least partly means that the innermost shaft of the telescoped shafts may also be a solid shaft. The innermost shaft may be the shaft for the plunger or press mold arranged highest in the vertical direction. The outermost hollow shaft may be the shaft for the plunger or press mold arranged lowest in the vertical direction. The outermost hollow shaft, i.e. the hollow shaft having the largest diameter, may be supported on the base of the apparatus via suitable bearing means, and the remaining shafts are supported in this hollow shaft via suitable bearing means. This simplifies the assembly of the apparatus. Base of the apparatus refers to the main body of the apparatus or a frame of the apparatus. The plungers and press molds can be driven via the respective shafts for transport movement. To this end, each shaft may have external teeth, at which a gear, toothed belt, or toothed chain of a drive motor engages. Alternatively, torque motors may be arranged directly at the shafts, so that the respective rotors or output shafts of the motors are directly connected to the respective shafts of the plungers or of the press molds.

Advantageously, the telescoped arrangement of the hollow shafts of the plungers and press molds allows a compact, stable construction and simple assembly of the apparatus.

The first plunger and the second plunger may each have a linear actuator by means of which the respective plungers can be moved in the vertical direction.

The linear actuators may include pneumatic or hydraulic cylinders. Linear servo motors may be used, however, which have advantages in terms of robustness and controllability. By means of the linear actuators, the plungers can perform the pressing movement during the interaction with the associated press molds, i.e. the plunger can be moved relative to the associated press mold in the relative direction, in order to reshape the gob in the plunger to form the preform.

Advantageously, the linear actuators, which are moved along with the plunger as part of the plunger, allow the plunger to perform the pressing movement independent of the transport movement. Moreover, the vertical movability can be used to arrange the plunger at a height in a targeted manner upon reception of the gob in the gob-receiving region in order to receive the gob in an optimum way.

A further aspect relates to a blowing machine plant including the above-described apparatus, further including a melting tank having a drop outlet, shears for separating gobs at the drop outlet, and a rotatory blowing machine having a plurality of rotatably arranged work tables.

Glass can be melted in the melting tank, which can then be removed via the drop outlet. The liquid glass exiting the drop outlet can be cut or separated by means of the shears in order to obtain a gob. The gob-receiving region may be arranged substantially below the drop outlet or, if a gob chute is present, be arranged at the end of the gob chute. The work tables are rotatably arranged about a vertical axis in a carousel-like fashion. The blowing machine plant includes a set preform-placing region through which the work tables pass successively.

The work tables may at least partly be plate-shaped components, which each have a circular recess, for example. The work tables are designed such that a gob can be placed thereon so that the recess is covered by the gob and the peripheral area of the gob is supported by the work table. A blow head of the rotary blowing machine may lower onto the gob, so that it forms an airtight seal with the gob, and the gob can be blown up through the recess of the work table. A blow mold for defining the outer contour of the glass product to be blown can each be arranged below the work table. The rotary blowing machine may particularly be a goblet blowing machine.

The rotary blowing machine may include one support bottom per work table, which bottom can be moved in a vertical direction.

The support bottom is arranged below the respective work table and, optionally, below the respective blow mold, and rotates along with the respective associated work table. The apparatus allows for providing such support bottoms. The support bottoms serve to support the blown up preforms or glass products from below, so that the blowing process can be controlled in an improved way.

A further aspect relates to a method for pressing glass preforms, or parisons, and placing the glass preforms into a blowing machine. The method includes receiving a first gob by means of a first plunger in a gob-receiving region; transporting the first gob by means of the first plunger to a first preform, or parison, pressing region; forming a first gob in the first preform-pressing region by interaction of the first plunger with a first press mold, wherein the first glass preform is received by the first press mold; moving back the first plunger from the first preform-pressing region to the gob-receiving region after the first glass preform has been received by the first press mold; transporting the first glass preform by means of the first press mold from the first preform-pressing region to a preform, or parison, placing region and placing the first glass preform into the blowing machine; receiving a second gob by means of a second plunger in the gob-receiving region; transporting the second gob by means of the second plunger to a second preform, or parison, pressing region; and forming a second glass preform in the second preform-pressing region by interaction of the second plunger with a second press mold, wherein the second glass preform is received by the second press mold. The method further includes moving back the second plunger from the second preform-pressing region to the gob-receiving region after the second glass preform has been received by the second press mold; transporting the second glass preform by means of the second press mold from the second preform-pressing region to a preform, or parison, placing region and placing the second glass preform into the blowing machine.

The second gob may be received by means of the second plunger after the first gob has been received by means of the first plunger and has been transported to the first preform-pressing region. Further, the second gob may be formed after the first gob has been formed. Further, the second gob may be placed into the blowing machine after the first gob has been placed into the blowing machine and the first press mold has been moved back to the first preform-pressing region.

The above discussion of the apparatus and the blowing machine plant also applies to the method described herein.

BRIEF DESCRIPTION OF THE DRAWINGS

Example embodiments will be explained with reference to the figures, in which.

DETAILED DESCRIPTION OF THE DISCLOSURE

Figure 1:
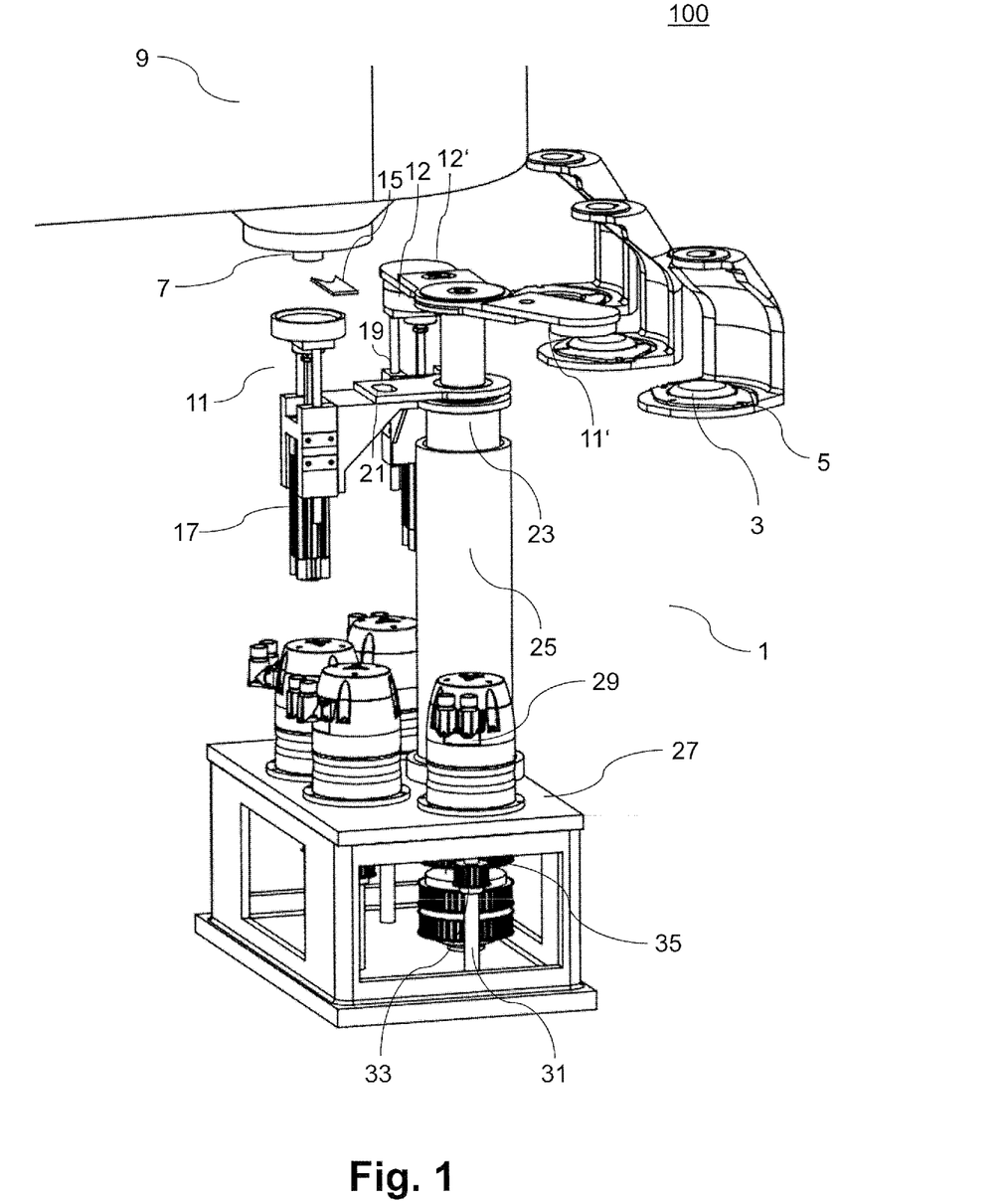
FIG. 1 is a perspective view of an apparatus according to an example embodiment as part of a blowing machine plant.

FIG. 1 shows an example embodiment of an apparatus 1 for pressing glass preforms, or parisons, 3 and placing the preforms 3 onto a work table 5 of a non-illustrated blowing machine. The non-illustrated blowing machine includes a plurality of work tables 5, which are rotatably arranged around the blowing machine in a carousel-like fashion. However, only three of these work tables 5 are shown in FIG. 1. The apparatus 1 is arranged between a drop outlet 7 of a melting tank 9 and the work tables 5 of the rotary blowing machine. The apparatus 1 includes a first plunger 11 and a first press mold 11' associated with the first plunger 11. The apparatus 1 further includes a second plunger 12 and a second press mold 12' associated with the second plunger 12. The plungers 11, 12 are adapted to receive a gob, which is separated from molten glass by means of the shears 15 at the drop outlet 7, in a dedicated receiving region. The receiving region of the plungers 11, 12 may be cup-shaped and open to the top. By interacting with the press molds 11', 12', the plungers 11, 12 reshape the gob to form a glass preform, or parison, 3. After forming the glass preform 3, the press mold 11', 12' receives the glass preform 3, for example by suction, transports the gob 3 further to the work table 5 and places it there, for example by blowing it off.

The plungers 11, 12 include linear actuators 17, 19, respectively, which can linearly move the respective plunger, in particular the receiving region thereof, in the vertical direction. The linear actuators 17, 19 may be driven pneumatically, hydraulically, or electrically. The plungers 11, 12 and press molds 11', 12' are each connected via pivot arms 21 with associated pivot shafts 23. The length of the pivot arms 21 can be adjusted to adapt the apparatus 1 to different blowing machine plants. The pivot shafts 23 are each rotatably supported about a vertical axis. Particularly, the respective pivot shafts 23 are designed as hollow shafts 23 inserted into each other, which are rotatably supported relative to each other. The outermost pivot shaft 23 is arranged and supported in a hollow-cylindrical guide 25. The hollow-cylindrical guide 25 is connected to the base 27 of the apparatus or forms part of the base 27. The plungers 11, 12 and the press molds 11', 12' are connected to the apparatus 1 so as to be pivotable in a horizontal plane via the pivot shafts 23 and the arms 21.

One drive motor 29 per pivot shaft 23 or per plunger 11, 12 and per press mold 11', 12' is arranged at the base 27 of the apparatus 1. The four drive motors 29 drive one drive shaft 31 each, wherein the drive shafts 31 each comprise one drive gear 33. On the other hand, the pivot shafts 23 each include a gear 35 in the lower end region of the pivot shafts 23. The respective drive gears 33 of the drive shafts 31 are connected to the respective associated gears 35 of the pivot shafts 23 via non-illustrated toothed belts. In this way, the respective pivot shafts 23 can be driven independently via the respective drive motors 29. The control unit for controlling the drive motors 29 and/or the linear actuators 17, 19 is not illustrated.

Figure 2:
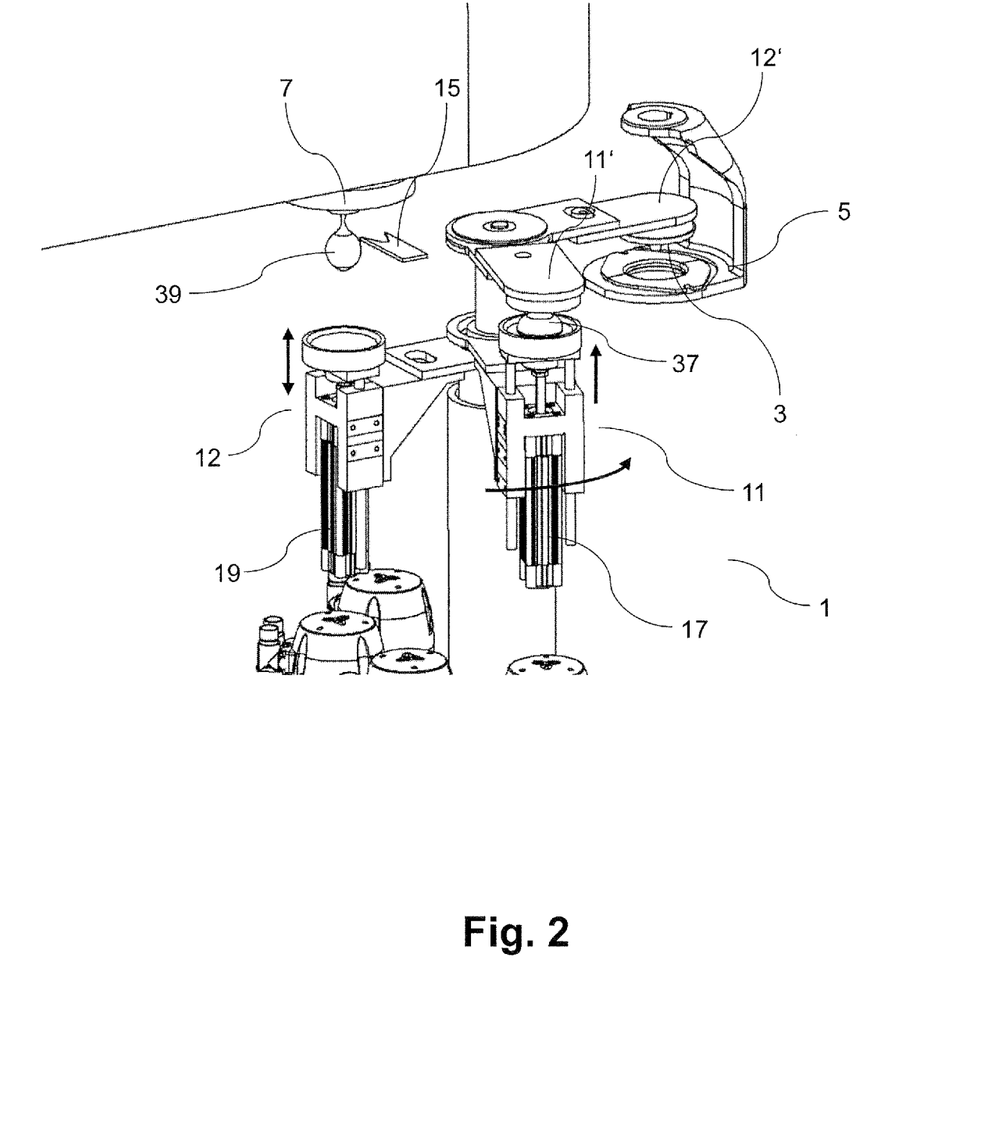
FIG. 2 is a motion sequence of the apparatus in a first state in a perspective view.

FIG. 2 shows a motion sequence of the apparatus 1 in a first state. In this first state, the first plunger 11 has already received a gob 37 and has already been pivoted into the first preform-pressing region, where it has been aligned with respect to the first press mold 11' such that the first plunger 11 is arranged directly below the first press mold 11' in the vertical direction. In the illustrated first state, the plunger 11 retracts upward in the vertical direction by means of the linear actuator 17 in order to form a glass preform from the gob 37 together with the first press mold 11'. Here, the first plunger 11 and the first press mold 11' are pivoted further with angular synchronism, so that during pressing of the glass preform the gob 37 or the glass preform is moved further toward the rotary blowing machine. The pivot direction of the first plunger 11 and of the first press mold 11' is counterclockwise when the apparatus 1 is seen in top view (from above). The movement range or angular range, in which the (first or second) plunger and the associated (first or second) press mold are in a mutually aligned state and optionally move with angular synchronism, may be referred to as a (first or second) preform-pressing region. In the illustrated first state, however, the second press mold 12' is arranged in the preform-placing region, where it is about to place the previously formed glass preform 3 onto the work table 5 of the blowing machine. On the other hand, in the illustrated first state, the second plunger 12 is arranged in the gob-receiving region below the drop outlet 7 and is about to receive a new gob, which is cut off from the liquid molten glass 39 by means of the shears 15. As indicated by the arrows, the plunger 12 can be moved in the vertical direction by means of the linear actuator 19 to influence the pick-up position of the gob in the plunger 12.

Figure 3:
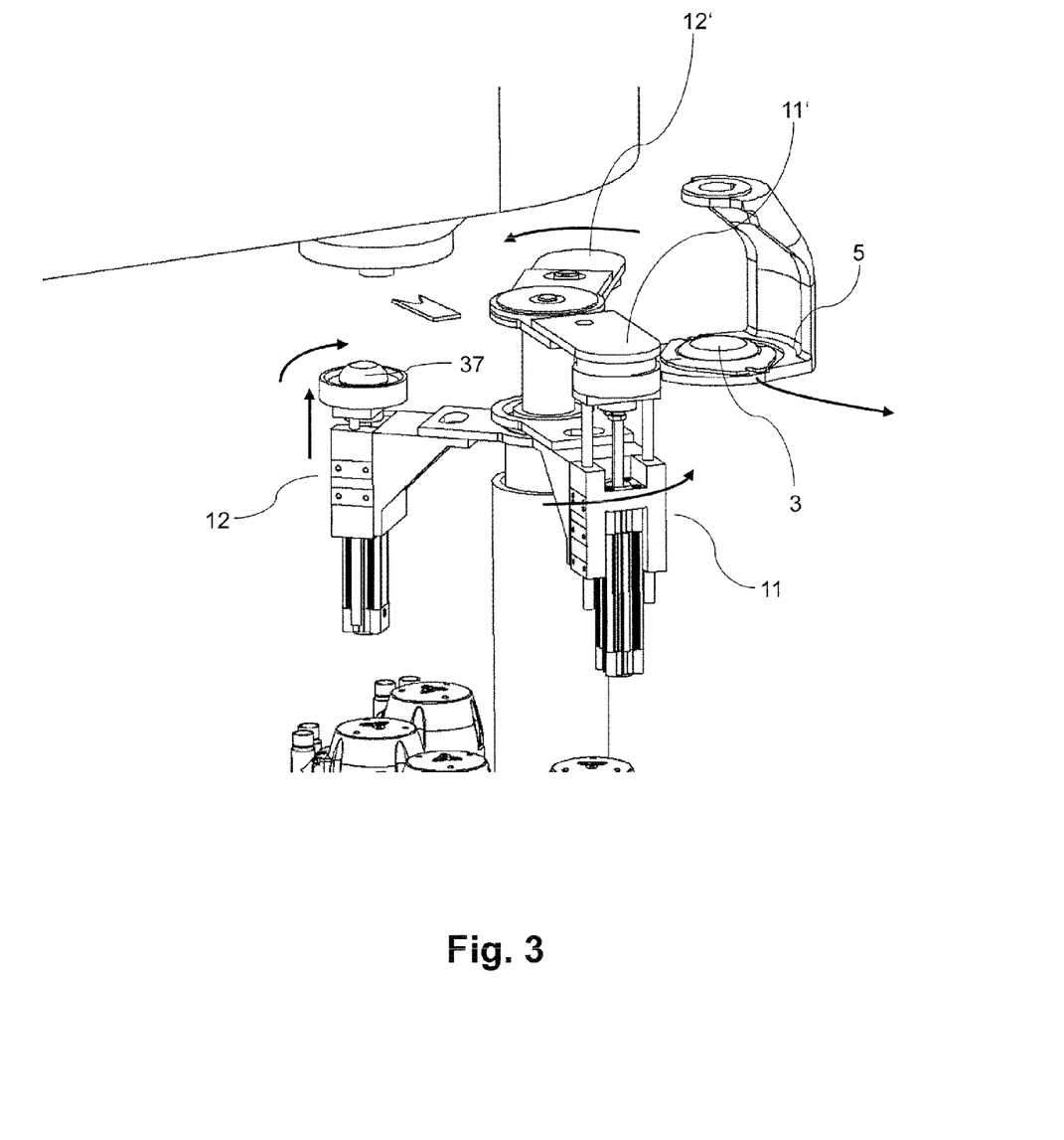
FIG. 3 is a motion sequence of the apparatus in a second state in a perspective view.

FIG. 3 shows a motion sequence of the apparatus 1 in a second state, which is a state shortly after the first state shown in FIG. 2. In the second state, the second plunger 12 has received the gob 37 and moves away from the gob-receiving region toward the second preform-pressing region. The pivot direction of the second plunger 12 is clockwise when the apparatus 1 is seen in top view. On the other hand, in the second state, the second press mold 12' has placed the glass preform 3 onto the work table 5, and the work table 5 moves away from the preform-placing region. The blowing machine may be designed such that, in the preform-placing region, the respective work tables 5 reduce their speed, stop briefly, or pass the preform-placing region without changing their speed. In the second state, the second press mold 12' moves away from the preform-placing region toward the second preform-pressing region. In other words, the second plunger 12 and the second press mold 12' move toward each other in the second state so as to align with respect to each other in the second preform-pressing region. In the second state, the first plunger 11 and the first press mold 11' are closed and press-form the glass preform, wherein the first plunger 11 and the first press mold 11' are pivoted further toward the rotary blowing machine with angular synchronism.

Figure 4:
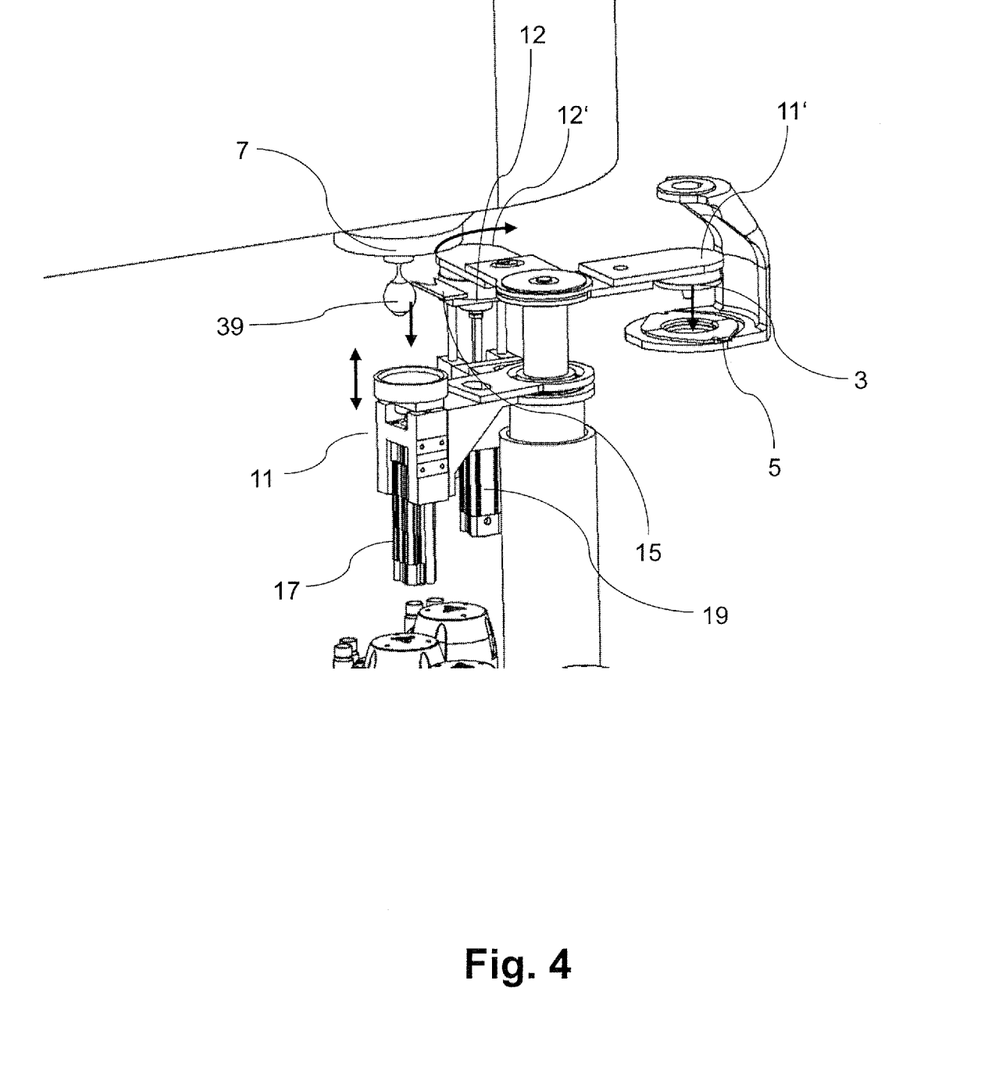
FIG. 4 is a motion sequence of the apparatus in a third state in a perspective view.

FIG. 4 shows a motion sequence of the apparatus 1 in a third state, which is a state shortly after the second state shown in FIG. 3. In this third state, the second plunger 12 has already been pivoted into the second preform-pressing region, aligned with respect to the second press mold 12', and presses the previously received gob to form a glass preform by vertical movement by means of the linear actuator 19 in cooperation with the second press mold 12'. While the glass preform is being formed, the second plunger 12 and the second press mold 12' are pivoted further with angular synchronism, so that during pressing of the glass preform, the gob or glass preform is moved further toward the rotary blowing machine. The pivot direction of the second plunger 12 and of the second press mold 12' is clockwise when the apparatus 1 is seen in top view. In the illustrated third state, however, the first press mold 11' is arranged in the preform-placing region, where it is about to place the previously formed glass preform 3 onto the work table 5 of the blowing machine. On the other hand, in the illustrated third state, the first plunger 11 is arranged in the gob-receiving region below the drop outlet 7 and is about to receive a new gob, which is cut off from the liquid molten glass 39 by means of the shears 15. As indicated by the arrows, the plunger 11 can be moved in the vertical direction by means of the linear actuator 17 to influence the pick-up position of the gob in the plunger 11. The third state illustrated in FIG. 4 roughly corresponds to a state between the first state illustrated in FIG. 2 and the second state illustrated in FIG. 3, with the difference that the positions and movement directions of the first plunger 11 and of the second plunger 12 as well as the positions and movement directions of the first press mold 11' and of the second press mold 12' are interchanged.

For a better understanding, FIGS. 5A-5D shows a motion sequence of the apparatus 1 again in top view. FIGS. 5A-5D show four successive states of the plungers 11, 12 and of the press molds 11', 12' during the motion sequence of the apparatus.

Figure 5A:
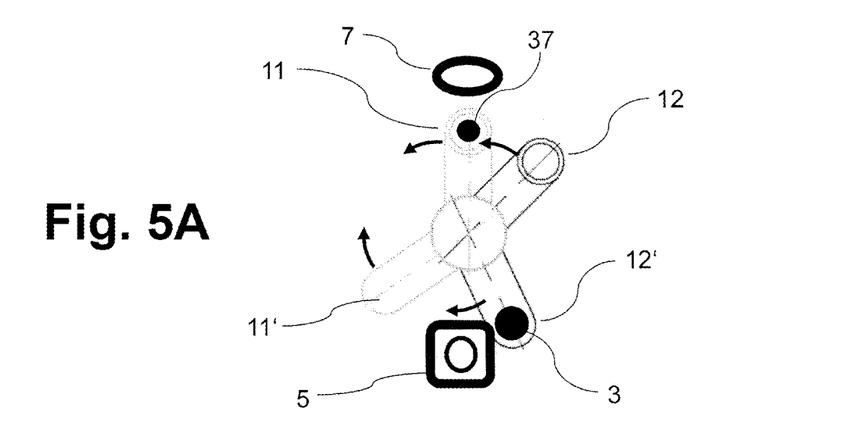
FIGS. 5A-5D are motion sequences of the apparatus in a top view.
Figure 5B:
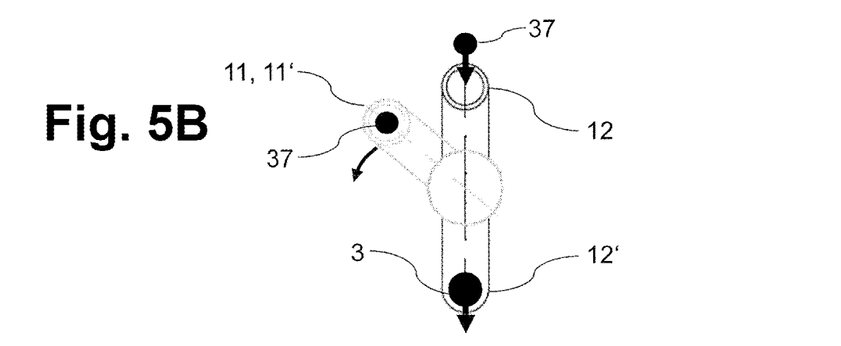
Figure 5C:
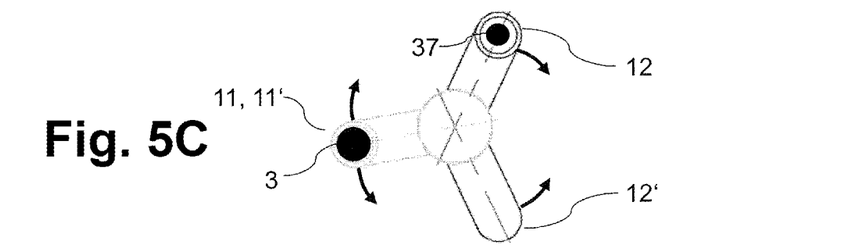
Figure 5D:
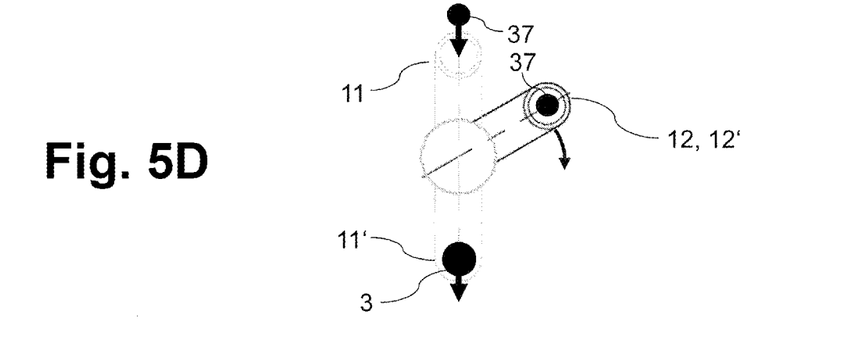

In the state shown in FIG. 5A, the first plunger 11 is arranged in the gob-receiving region below the drop outlet 7. In the state shown in FIG. 5A, the first plunger 11 has already received a gob 37 and is about to move away from the gob-receiving region toward the first preform-pressing region with the first gob 37. In the state shown in FIG. 5A, the first press mold 11' moves in the direction of the first preform-pressing region toward the first plunger 11. On the other hand, in the state shown in FIG. 5A, the second press mold 12' has already received the glass preform 3 formed in cooperation with the second plunger 12 and moves toward the preform-placing region. The second plunger 12, however, moves back toward the gob-receiving region. For increased clarity, the work table 5 is indicated in the preform-placing region in FIG. 5A. In fact, however, the rotating work table 5 does not need to be arranged in the preform-placing region in the state shown in FIG. 5A. In FIGS. 5A-5D, the gob-receiving region is always at the "12 o'clock position", and the preform-placing region is always at the "6 o'clock position". The gob-receiving region and the preform-placing do not necessarily have to be arranged with an offset of 180°. In FIGS. 5B to 5D, the drop outlet 7 and the work table 5 are not illustrated any more for the sake of simplicity.

In the state shown in FIG. 5B, the first plunger 11 and the first press mold 11' are aligned with respect to each other or are arranged on top of each other and are about to reshape the gob 37 to form a glass preform by mutual movement in the vertical direction. Here, the first plunger 11 and the first press mold 11' move further in the horizontal direction, aligned with respect to each other. In this state, both the first plunger and the first press mold are located in the first preform-pressing region. On the other hand, in the state shown in FIG. 5B, the second plunger 12 is arranged in the gob-receiving position and is about to receive a new gob 37. The second press mold 12', however, is arranged in the preform-placing region and is about to place the glass preform 3 into the blowing machine.

In the state shown in FIG. 5C, the first plunger 11 and the first press mold 11' have reshaped the gob into a glass preform 3. The first press mold 11' is about to receive the finished glass preform 3 and to move toward the preform-placing region, while the first plunger 11 is about to move back toward the gob-receiving region without the glass preform 3. In the state shown in FIG. 5C, the first plunger 11 and the first press mold 11' are located in an end position of the preform-pressing region. On the other hand, in the state shown in FIG. 5C, the second press mold 12', which has placed the glass preform into the blowing machine before, moves back toward the second preform-pressing region, and the second plunger 12, which has received the new gob 37 before, moves in the opposite pivot direction toward the second preform-pressing region as well.

In the state shown in FIG. 5D, the first plunger 11 is arranged in the gob-receiving position and is about to receive a new gob 37. The first press mold 11', however, is arranged in the preform-placing region and is about to place the glass preform 3 into the blowing machine. On the other hand, the second plunger 12 and the second press mold 12' are aligned with respect to each other or are arranged on top of each other and are about to reshape the gob 37 to form a glass preform by mutual movement in the vertical direction. Here, the second plunger 12 and the second press mold 12' move further in the horizontal direction, aligned with respect to each other. In this state, both the second plunger and the second press mold are located in the second preform-pressing region.

The state shown in FIG. 5D corresponds to the state shown in FIG. 5B, with the difference that the positions and movement directions of the first plunger 11 and of the second plunger 12 as well as the positions and movement directions of the first press mold 11' and of the second press mold 12' are interchanged. In this way, the motion sequence of the apparatus allows continuous pressing and placing of glass preforms.

Figure 6:
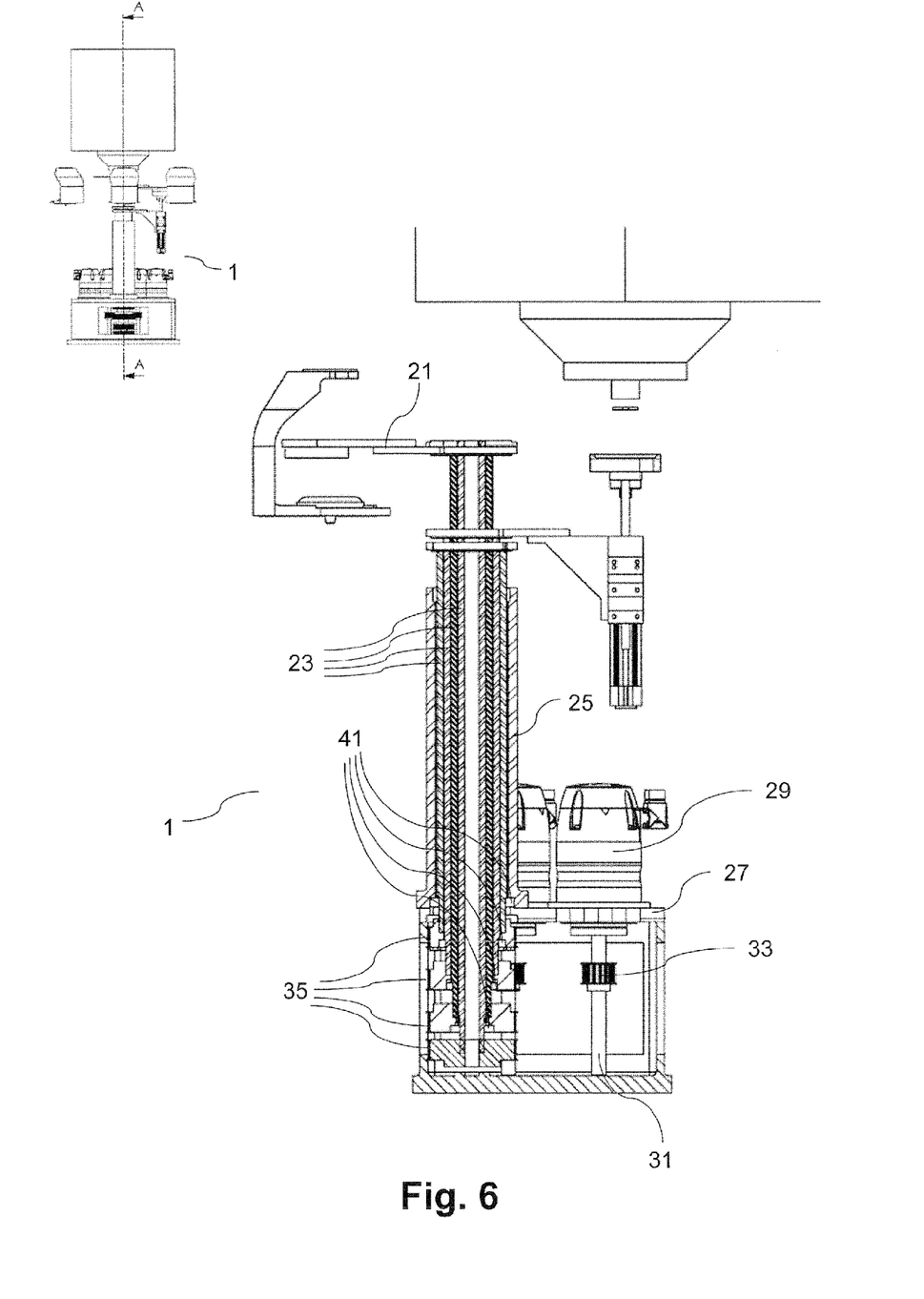
FIG. 6 is a sectional view of the mounting and the drive of the apparatus.

FIG. 6 shows a sectional view of the mounting and the drive of the apparatus 1 along the sectional line A-A, as indicated in the minimized representation of the apparatus 1 at the top left. The pivot shafts 23 of the plungers 11, 12 and the press molds 11', 12' are designed as hollow shafts 23 inserted into each other. At the upper ends, the pivot shafts 23 are connected to the pivot arms 21 of the respective plungers 11, 12 and press molds 11', 12'. The plunger 11, 12 or press mold 11', 12' arranged lowest in the vertical direction may be connected to the outermost one (seen in the radial direction) of the pivot shafts 23, the plunger 11, 12 or press mold 11', 12' arranged second lowest in the vertical direction is connected to the second outermost one (seen in the radial direction) of the pivot shafts 23, the plunger 11, 12 or press mold 11', 12' arranged third lowest in the vertical direction is connected to the third outermost one (seen in the radial direction) of the pivot shafts 23, and the plunger 11, 12 or press mold 11', 12' arranged highest in the vertical direction is connected to the innermost one (seen in the radial direction) of the pivot shafts 23. For example, the outermost pivot shaft 23 is connected to the first plunger 11, the second outermost pivot shaft 23 is connected to the second plunger 12, the third outermost pivot shaft 23 is connected to the first press mold 11', and the innermost pivot shaft 23 is connected to the second press mold 12'. The outermost pivot shaft 23 is supported in the hollow-cylindrical guide 25 of the base 27 of the apparatus 1 by means of a rolling bearing 41. Similarly, the second outermost pivot shaft 23 is supported in the outermost pivot shaft 23 by means of a further rolling bearing 41, the third outermost pivot shaft 23 is supported in the second outermost pivot shaft 23 by means of a further rolling bearing 41, and the innermost pivot shaft 23 is supported in the third outermost pivot shaft 23 by means of a further rolling bearing 41. Gears 35 are arranged at the lower ends of the respective pivot shafts 23. The four gears 35 are of the same size and are arranged concentrically one on top of the other. Similar to end caps, the gears 35 can be suitably connected to the respective pivot shafts 23 at the lower ends thereof in a manner fixed against rotation. The end cap-like gears 35, in particular those of the outermost, second outermost, and third outermost pivot shafts 23, may each be formed to receive one of the rolling bearings 41. The gears 35 are each connected to one of the drive gears 33 of the four drive motors 29 via toothed belts. Driving the respective drive shafts 31 of the drive motors 29, on which each of the drive gears 33 is arranged in a manner fixed against rotation, allows rotating the respective pivot shafts 23 and thus pivoting the respective plungers 11, 12 and press molds 11', 12'.

Figure 7:
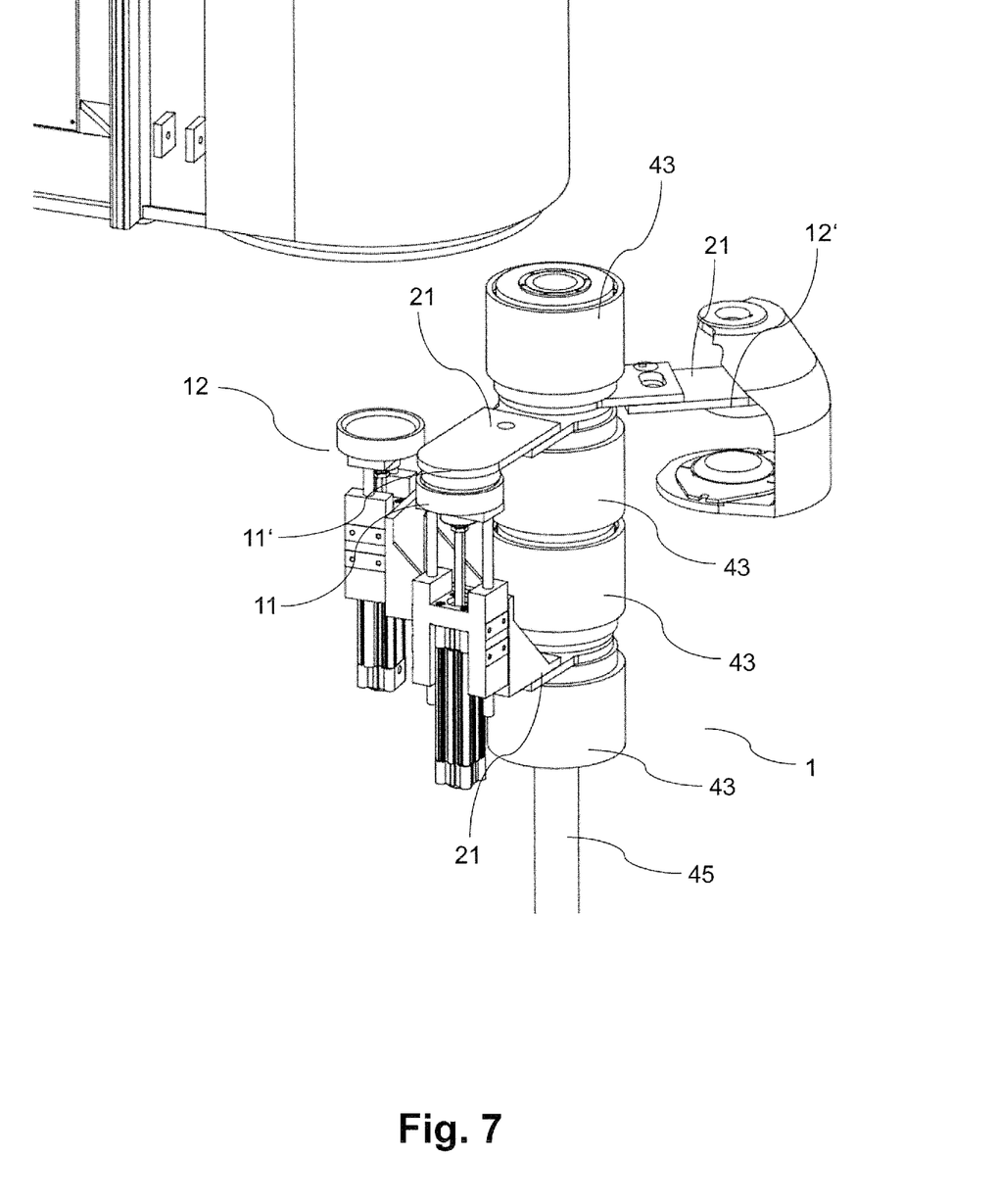
FIG. 7 is a perspective view of an apparatus according to a further example embodiment.

FIG. 7 shows a perspective view of an apparatus 1 according to another example embodiment. The apparatus 1 according to this example embodiment differs from the above-described example embodiment in the configuration of the drive of the plungers 11, 12 and the press molds 11', 12'. In the example embodiment shown in FIG. 7, the plungers 11, 12 and the press molds 11', 12', specifically the pivot arms 21 thereof, are each directly connected to the output shaft of a motor 43, specifically a torque motor 43. The motors 43 are arranged on a common mounting shaft 45, the longitudinal axis thereof corresponding to the axis of rotation of the plungers 11, 12 and the press molds 11', 12'. The mounting shaft 45 may be connected to a base of the apparatus 1. The output sides of the motors 43 of the first press mold 11' and of the second press mold 12' are oriented toward each other, wherein this arrangement may be referred to as an overhead arrangement. This arrangement permits a minimal height offset of the first press mold 11' and of the second press mold 12'. Similarly, the motors 43 of the first plunger 11 and of the second plunger 12 are arranged in an overhead arrangement.

This written description uses examples to disclose the embodiments, including the best mode, and also to enable any person skilled in the art to practice the disclosure, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for pressing glass preforms and placing the glass preforms into a blowing machine, the apparatus comprising:
   a first plunger configured to be reciprocated between a gob-receiving region and a first preform-pressing region;
   a second plunger configured to be reciprocated between the gob-receiving region and a second preform-pressing region;
   a first press mold associated with the first plunger and configured to be reciprocated between the first preform-pressing region and a preform-placing region; and
   a second press mold associated with the second plunger and configured to be reciprocated between the second preform-pressing region and the preform-placing region;
   wherein the respective plungers are configured to interact with the respective associated press molds in the respective preform-pressing regions such that a gob received in the gob-receiving region by one of the respective plungers is formed into a glass preform and received by the respective associated press mold; and
   wherein the apparatus is configured such that after interaction of the respective plunger with the respective associated press mold, the respective plunger is configured to move back to the gob-receiving region while the respective press mold is configured to move to the preform-placing region to place the glass preform into the blowing machine at the preform-placing region.

2. The apparatus according to claim 1, wherein the first plunger, the second plunger, the first press mold, and the second press mold are each pivotably arranged about a common vertical axis.

3. The apparatus according to claim 1, wherein movement of the first plunger from the gob-receiving region to the first preform-pressing region and movement of the second plunger from the gob-receiving region to the second preform-pressing region are in opposite directions of rotation.

4. The apparatus according to claim 1, wherein the first plunger, the second plunger, the first press mold, and the second press mold are configured to be moved independently.

5. The apparatus according to claim 1, wherein the first plunger, the second plunger, the first press mold, and the second press mold are at least partly supported on a base of the apparatus via telescoped hollow shafts.

6. The apparatus according to claim 1, wherein the first plunger and the second plunger each have a respective linear actuator, by means of which the respective plungers are configured to be moved in a vertical direction.

7. A blowing machine plant comprising an apparatus according claim 1, further comprising a melting tank having a drop outlet, shears for separating gobs at the drop outlet, and a rotatory blowing machine having a plurality of rotatably arranged work tables.

8. The blowing machine plant according to claim 7, wherein the rotary blowing machine comprises one support bottom per work table, each support bottom configured to be moved in a vertical direction.

9. The blowing machine plant according to claim 7, wherein the first plunger, the second plunger, the first press mold, and the second press mold are each pivotably arranged about a common vertical axis.

10. The blowing machine plant according to claim 7, wherein movement of the first plunger from the gob-receiving region to the first preform-pressing region and movement of the second plunger from the gob-receiving region to the second preform-pressing region are in opposite directions of rotation.

11. The blowing machine plant according to claim 7, wherein the first plunger, the second plunger, the first press mold, and the second press mold are configured to be moved independently.

12. The blowing machine plant according to claim 7, wherein the first plunger, the second plunger, the first press mold, and the second press mold are at least partly supported on a base of the apparatus via telescoped hollow shafts.

13. The blowing machine plant according to claim 7, wherein the first plunger and the second plunger each have a respective linear actuator, by means of which the respective plungers are configured to be moved in a vertical direction.

14. A method for pressing glass preforms and placing the glass preforms into a blowing machine, the method comprising:
    receiving a first gob by means of a first plunger in a gob-receiving region;
    transporting the first gob to a first preform-pressing region by means of the first plunger;
    forming a first glass perform in the first preform-pressing region by interaction of the first plunger with a first press mold, wherein the first glass preform is received by the first press mold;
    moving back the first plunger from the first preform-pressing region to the gob-receiving region after the first glass preform has been received by the first press mold;
    transporting the first glass preform by means of the first press mold from the first preform-pressing region to a preform-placing region and placing the first glass preform into the blowing machine;
    receiving a second gob by means of a second plunger in the gob-receiving region;
    transporting the second gob to a second preform-pressing region by means of the second plunger;
    forming a second glass preform in the second preform-pressing region by interaction of the second plunger with a second press mold, wherein the second glass preform is received by the second press mold;
    moving back the second plunger from the second preform-pressing region to the gob-receiving region after the second glass preform has been received by the second press mold; and
    transporting the second glass preform by means of the second press mold from the second preform-pressing region to a preform-placing region and placing the second glass preform into the blowing machine.

15. The method according to claim 14, wherein placing the first glass preform into the blowing machine comprises placing the first glass preform into a blowing machine that includes a plurality of rotatably arranged work tables.

16. The method according to claim 15, wherein placing the first glass preform into the blowing machine comprises placing the first glass preform into a blowing machine that includes one support bottom per work table, each support bottom configured to be moved in a vertical direction.

17. The method according to claim 14, wherein the first plunger, the second plunger, the first press mold, and the second press mold are each pivotably arranged about a common vertical axis.

18. The method according to claim 14, wherein the first plunger, the second plunger, the first press mold, and the second press mold move independently from one another.

19. The method according to claim 14, wherein the first plunger, the second plunger, the first press mold, and the second press mold are at least partly supported on a base of the apparatus via telescoped hollow shafts.

20. The method according to claim 14, wherein the first plunger and the second plunger each have a respective linear actuator that move the first and second plungers in a vertical direction.

* * * * *